United States Patent
Hiyoshi et al.

(10) Patent No.: US 6,811,001 B2
(45) Date of Patent: Nov. 2, 2004

(54) ELECTROMAGNETIC BRAKE

(75) Inventors: Toshio Hiyoshi, Saitama (JP); Rikiya Kunii, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/624,566

(22) Filed: Jul. 23, 2003

(65) Prior Publication Data

US 2004/0129511 A1 Jul. 8, 2004

(30) Foreign Application Priority Data

Jul. 24, 2002 (JP) ..................................... P. 2002-215435

(51) Int. Cl.$^7$ ............................. F16D 55/36; B60L 7/00
(52) U.S. Cl. .................... 188/71.5; 188/161; 192/12 D; 192/222
(58) Field of Search ............................... 188/161, 71.5; 192/12 D, 222, 226, 84.1–84.701; 254/387, 214

(56) References Cited

U.S. PATENT DOCUMENTS

| | | | | |
|---|---|---|---|---|
| 2,863,326 A | * | 12/1958 | Maurice et al. ............ | 192/3.56 |
| 3,101,824 A | * | 8/1963 | Gail ........................ | 192/223.3 |
| 3,734,256 A | * | 5/1973 | Compton et al. ........ | 192/84.95 |
| 3,752,267 A | * | 8/1973 | Dovell et al. .............. | 188/171 |
| 4,718,523 A | * | 1/1988 | Schneider et al. .......... | 188/161 |
| 5,226,508 A | * | 7/1993 | Ericson et al. .............. | 187/254 |
| 5,274,290 A | * | 12/1993 | Fischer ........................ | 310/93 |
| 5,603,395 A | * | 2/1997 | Mabee ..................... | 192/70.13 |
| 5,669,469 A | * | 9/1997 | Ericson et al. .............. | 188/171 |
| 5,739,610 A | * | 4/1998 | Nemoto et al. ............... | 310/93 |
| 5,819,883 A | * | 10/1998 | Organek et al. ........... | 188/71.5 |
| 5,819,888 A | * | 10/1998 | Tamura et al. ........ | 188/218 XL |
| 6,119,825 A | * | 9/2000 | Nisley ........................ | 188/171 |
| 6,161,659 A | * | 12/2000 | Maurice ..................... | 188/171 |
| 6,182,803 B1 | * | 2/2001 | Hirai et al. ................. | 188/171 |
| 6,412,613 B1 | * | 7/2002 | Lu ............................. | 188/171 |
| 6,603,307 B2 | * | 8/2003 | Sekiya et al. ............... | 324/225 |
| 6,668,996 B2 | * | 12/2003 | Nekado et al. .......... | 192/84.91 |

OTHER PUBLICATIONS

U.S. Patent Application Publication No. 2003/0075395 A1 dated Apr. 24, 2003.

* cited by examiner

Primary Examiner—Robert A. Siconolfi

(57) ABSTRACT

An electromagnetic brake, interposed between a stationary housing and a rotational member, includes a multi-plate brake mechanism, a ring-like core member fixed within the housing, an exciting coil accommodated in a groove in the core member, and a ring-like armature disposed so as to confront the annular groove in the core member. The electromagnetic brake includes a cylindrical press member which having one end fixed to an outer circumferential portion of the armature and the other end engaged with the multi-plate brake mechanism and fitted on the core member, and also a cylindrical guide member having one end fixed to an inner circumferential portion of the armature and the other end fitted in the core member so that the armature is guided by the core member so as to move in the direction in which the multi-plate brake mechanism is pressed.

3 Claims, 8 Drawing Sheets

ELECTROMAGNETIC BRAKE

BACKGROUND OF THE INVENTION

The present invention relates to an electromagnetic brake and an automotive driving force distributing apparatus utilizing the same electromagnetic brake.

A differential is disposed along a power train of a vehicle so as to allow an outer wheel to rotate faster than an inner wheel during turning of the vehicle while keeping a torque distribution in which a torque is equally divided between the left and right wheels to thereby obtain a smooth turning in an ensured manner.

While a main function of the differential is to allow the vehicle to have a smooth turn on a curved road, what would happen, for example, in case only one of the wheels is trapped in a muddy spot to thereby start spinning while the vehicle is running on a rough road?

A small resistance is applied to the wheel trapped in the muddy spot and almost all the rotational force is transferred to the spinning wheel, whereby no traction is transferred to the other wheel. Thus, as a whole, the traction becomes too short for the wheel to get out of the muddy spot, which is a drawback of the differential in general.

It is a differential with a differential motion limiting mechanism that is intended to prevent the drawback, and the differential with a differential motion limiting mechanism has a function to compensate for the basic drawback which is inherent in the aforesaid differential. The differential of this type is referred to as a limited slip differential (LSD).

In general, the conventional differential is constituted by a planetary gear-type differential, and a planetary gear-type differential gear assembly is disclosed in JP-A-6-33997 which has a differential motion limiting mechanism including an electromagnetic clutch and a multi-plate clutch.

In this differential gear assembly, an attracting force between a solenoid and an armature of the electromagnetic clutch is applied to the multi-plate clutch so as to press against the multi-plate clutch to thereby selectively control the engagement force of the multi-plate clutch.

A connecting member having a plurality of legs is disposed between pressure plates of the multi-plate clutch and the armature. One ends of these legs are fixed to the pressure plates of the multi-plate clutch, and the other ends thereof are brought into abutment with inner circumferential portions of the armature when the solenoid is actuated.

In the aforesaid differential gear assembly, the plurality of legs are fixed to the pressure plates and extend in substantially a perpendicular direction to the pressure plates. Therefore, in the event that some of these legs are attached to the pressure plates in an inclined fashion, there may be caused a problem that a pressing force applied by the armature which is attracted by the solenoid is not uniformly transferred to the pressure plates of the multi-plate clutch.

Furthermore, in the differential gear assembly disclosed in the aforesaid unexamined patent publication, since the engagement force of the multi-plate clutch is controlled by the electromagnetic clutch, the plurality of legs or bars functioning as the press members are disposed so as to correspond to the inner circumferential portions of the armature.

In a multi-plate brake construction, however, brake plates and brake discs are generally disposed on an outer circumferential side when considering the construction of the brake apparatus. Therefore, it is difficult to apply the construction disclosed in the unexamined patent publication in which the armature and the multi-plate clutch are operatively connected to each other on the inner circumferential side to the multi-plate brake construction.

Hereinafter, described is a brief explanation of the related art, but not of a prior art for the present invention. The applicant of the invention previously proposed (in Japanese Patent Application No. 2001-267785 or its corresponding U.S. patent application ser. No. 10/198,176 (published as 20030075395) an electromagnetic brake which could solve the aforesaid problem. The electromagnetic brake according to the previous patent application includes a multi-plate brake mechanism, a ring-like core member having an annular exciting coil and a ring-like armature member disposed so as to correspond to the annular exciting coil of the core member.

The electromagnetic brake includes further a cylindrical pressure member which is fixed to an outer circumferential portion of the armature member at one end and is engaged with the multi-plate brake mechanism at the other end thereof and which is fitted on the core member in such a manner as to be guided by the core member so as to move in a direction in which the multi-plate brake mechanism is pressed.

The electromagnetic brake according to the previous patent application provides a construction in which an air gap is defined between the armature member and the core member, and the armature member is attracted by energizing the exciting coil so that the multi-plate brake mechanism is brought into engagement, and the thrust of the exciting coil is largely affected by the extent of the air gap.

The cylindrical press member of this electromagnetic brake has a function to transfer the thrust of the exciting coil to the multi-plate brake mechanism, as well as a function to implement the positioning of the armature member in a radial direction so that the armature member can be displaced uniformly in a circumferential direction.

In the electromagnetic brake according to the previous patent application, since the radial positioning accuracy of the armature member is designed to take priority, the cylindrical press member needs to be formed of a material of similar system/type to that of the core of the exciting coil in consideration of linear expansion due to change in temperature. In the electromagnetic brake according to the previous patent application, the cylindrical press member may be formed of a stainless steel.

Since the housing may be formed of an aluminum alloy in order to reduce the weight of the electromagnetic brake, the linear expansion of the housing does not match that of the cylindrical press member. When considering the electromagnetic brake as a whole, the air gap between the armature member and the core member changes as the temperature changes. There is a possibility that this may lead to a problem that the engagement force (braking force) of the multi-plate brake mechanism is caused to fluctuate.

Consequently, in the event that this electromagnetic brake is applied to an automotive driving force distributing apparatus, there is caused a problem that the implementation of appropriate driving force distribution becomes difficult as the temperature changes.

SUMMARY OF THE INVENTION

Thus, an object of the invention is to provide an electromagnetic brake which can restrain a fluctuation in the extent of the air gap between the armature member and the core member from occurring as the temperature changes.

According to a first aspect of the invention, there is provided an electromagnetic brake interposed between a stationary housing and a rotational member which is accommodated at least partially within the stationary housing.

The electromagnetic brake includes a multi-plate brake mechanism having a plurality of brake plates attached to the stationary housing and a plurality of brake discs attached to the rotational member in such a manner as to be interleaved with the plurality of brake plates, a ring-like core member having an annular groove and a first outside diameter and fixed within the housing, an annular exciting coil accommodated in the annular groove in the core member and a ring-like armature member having a second outside diameter which is larger than the first outside diameter and disposed in such a manner as to confront the annular groove in the core member.

The electromagnetic brake includes further a cylindrical press member having a first end and a second end and fitted on the core member in such a manner as to freely move in a direction in which the multi-plate brake mechanism is pressed, the first end being fixed to an outer circumferential portion of the armature member, the second end being brought into engagement with the multi-plate brake mechanism and a cylindrical guide member fixed to an inner circumferential portion of the armature member at one end thereof and fitted in the core member so that the armature member is guided by the core member so as to move in the direction in which the multi-plate brake mechanism is pressed.

According to the electromagnetic brake of the first aspect of the invention, since the cylindrical guide member is provided which is fixed to the inner circumferential portion of the armature member and is fitted in the core member, the radial positioning of the armature member is attained by the cylindrical guide member.

As a result, since the cylindrical press member does not have to include the function to implement the radial positioning of the armature, it is possible to select a material and to design the cylindrical press member while considering thermal expansion.

According to a second aspect of the invention, there is provided an electromagnetic brake, wherein the housing and the cylindrical press member are formed from an identical material. Since the housing and the cylindrical press member are formed of the identical material, it is possible to suppress a change in the extent of air gap between the armature member and the core member due to a change in temperature.

DETAILED DESCRIPTION OF THE PREFERRED EMBODIMENTS

Figure 1:
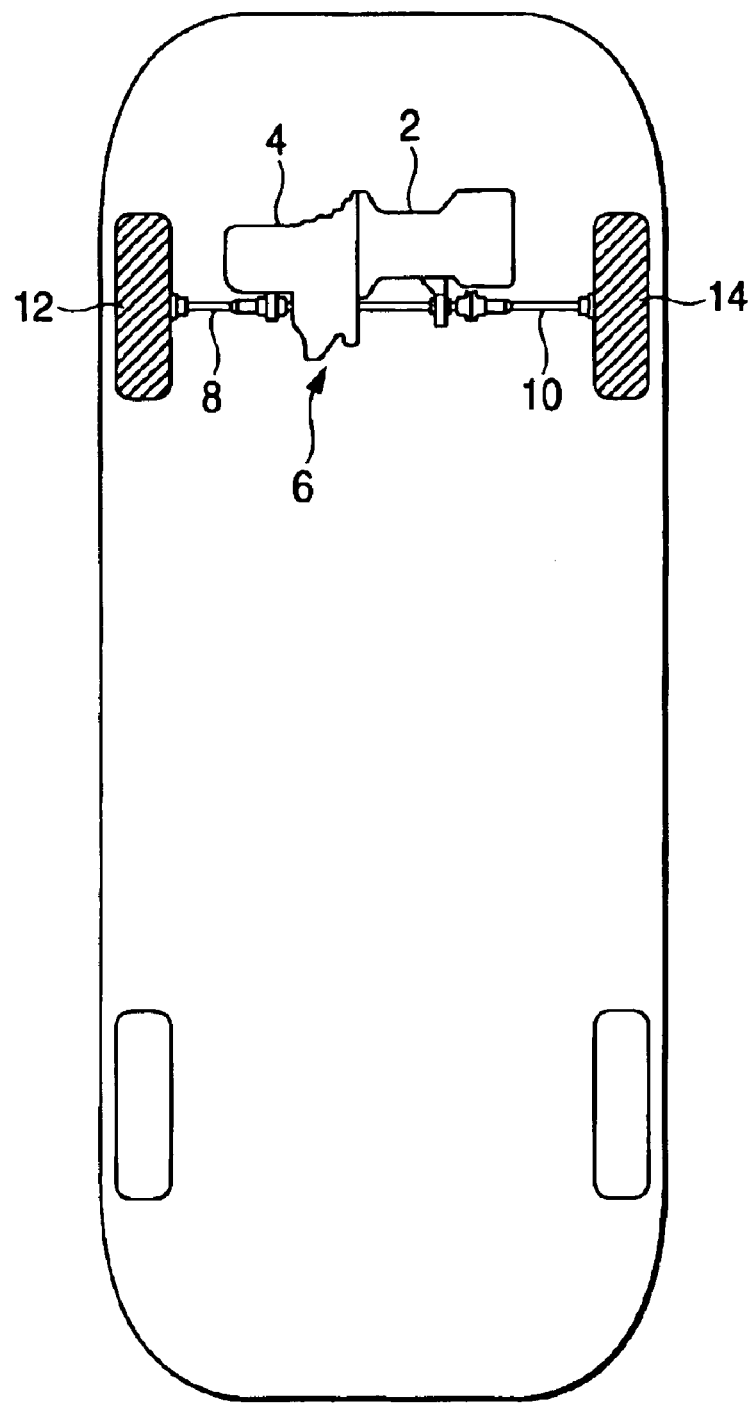
FIG. 1 is a schematic view showing the construction of an FF vehicle which installs therein a driving force distributing apparatus according to the invention.

An embodiment of the invention will be described in detail below by reference to the accompanying drawings. FIG. 1 is a schematic view showing the construction of a front-engine, front-drive (FF) vehicle to which a driving force distributing apparatus is applied which includes an electromagnetic brake according to the invention.

A driving force of an engine 2 is transmitted via a transmission 4 to a driving force distributing apparatus 6 which includes an electromagnetic brake according to the invention. The driving force which is distributed to left and right by the driving force distributing apparatus 6 drives left and right front wheels 12, 14 via front drive axles 8, 10, respectively.

Figure 2:
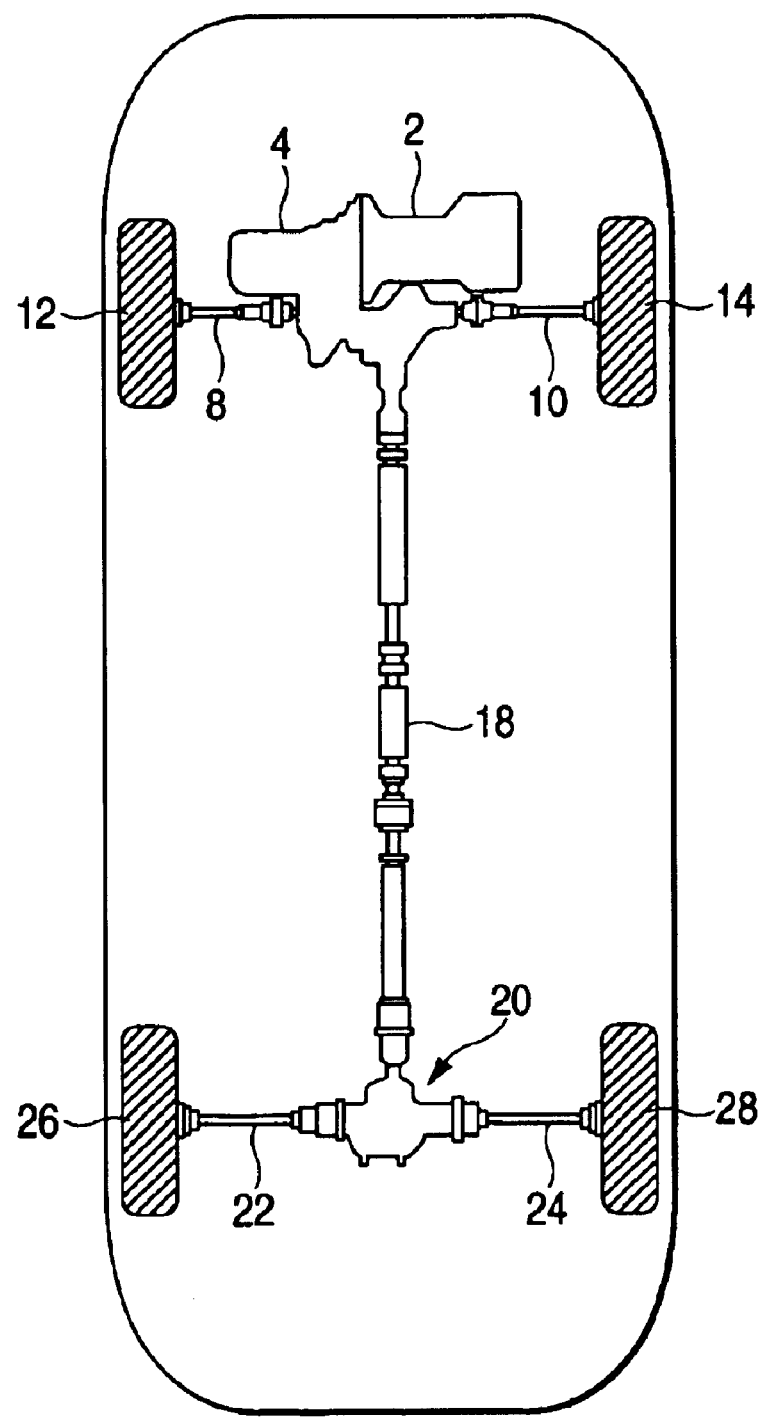
FIG. 2 is a schematic view showing the construction of a four wheel-drive which installs therein the driving force distributing apparatus according to the invention.

FIG. 2 is a schematic view showing the construction of a four-wheel drive vehicle to which a driving force distributing apparatus is applied which includes the electromagnetic brake according to the invention. The driving force of the engine 2 drives the left and right front wheels 12, 14 via the transmission 4 and the front drive axles 8, 10 and is also transferred to a driving force distributing apparatus 20 disposed on a rear wheels side which includes the electromagnetic brake according to the invention via a propeller shaft 18.

The driving force distributing apparatus 20 has substantially the same construction as that of the driving force distributing apparatus 6 in FIG. 1. Left and right rear wheels 26, 28 are driven via rear drive axles 22, 24 by the driving force distribution at a predetermined ratio by the driving force distributing apparatus 20.

As will be described in detail later on, by controlling braking force generated by a pair of electromagnetic brakes incorporated in the driving force distributing apparatus 20, not only can the driving force arbitrarily be distributed to the left and right rear wheels 26, 28 but also all the driving force of the engine 2 can be supplied to the left and right front wheels 12, 14 in the event that the rear wheels 26, 28 spin. As this occurs, the four-wheel drive vehicle becomes an FF vehicle.

Figure 3:
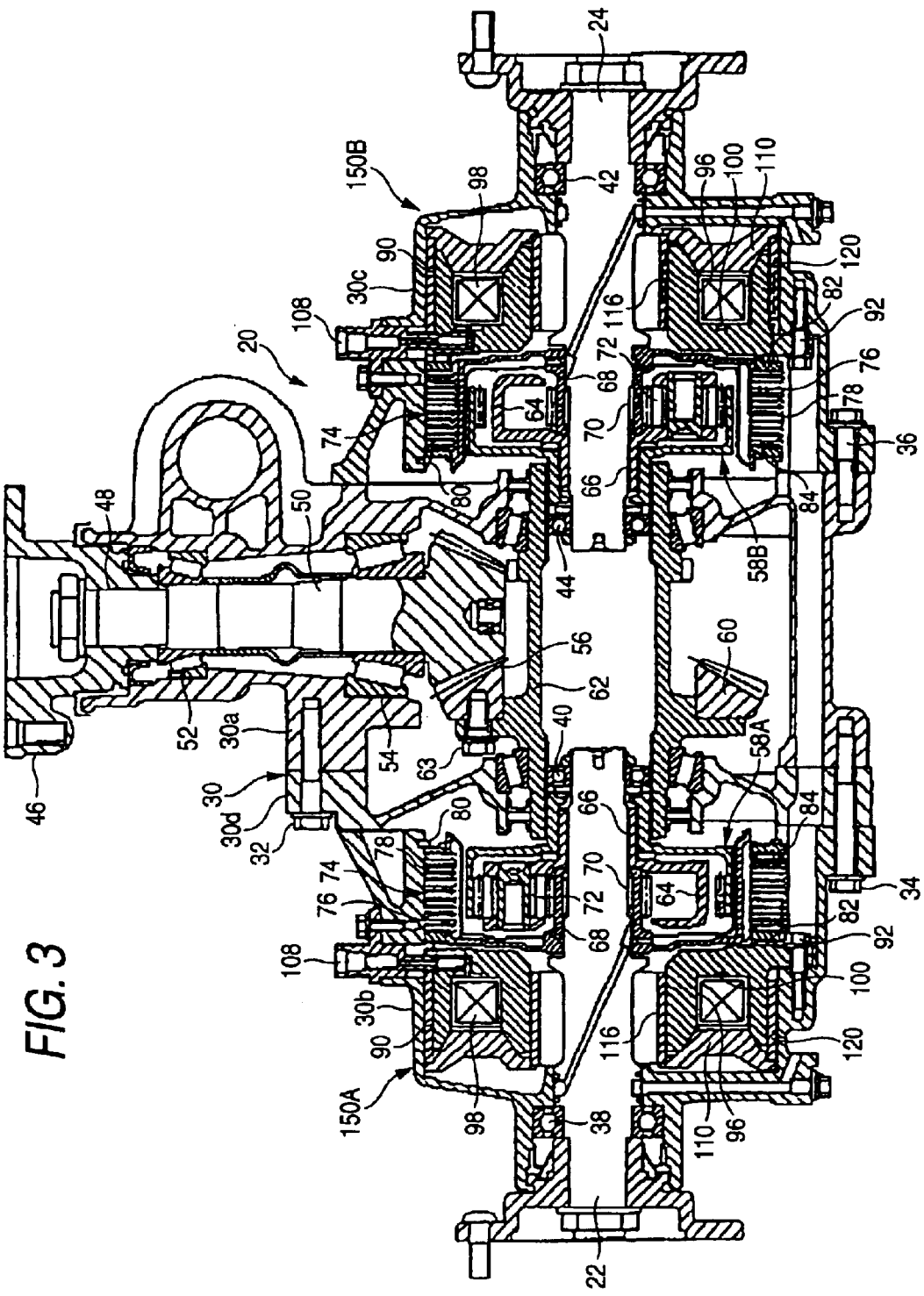
FIG. 3 is a sectional view of the driving force distributing apparatus according to an embodiment of the invention.

Referring to FIG. 3, a sectional view of the driving force distributing apparatus 20 according to the embodiment of the invention is shown. Reference numeral 30 denotes a stationary housing and includes a central housing 30a, left and right side housings 30b, 30c and an intermediate housing 30d. The housing 30 is formed of an aluminum alloy.

The side housing 30b and the intermediate housing 30d are fastened to the central housing 30a with screws 32, 34, and the side housing 30c is fastened to the central housing 30a with a screw 36.

In the housing 30, the left rear drive axle 22 is rotatably supported by a pair of bearings 38, 40 and similarly, the right rear drive axle 24 is rotatably supported by a pair of bearings 42, 44. The left rear drive axle 22 is connected to the left rear wheel 26 and the right rear drive axle 24 is connected to the right rear wheel 28.

Reference numeral 46 denotes a companion flange and is connected to the propeller shaft 18 shown in FIG. 2 with screws, not shown. An input shaft 50 is rotatably supported by a pair of needle bearings 52, 54 in the housing 30. The input shaft 50 is connected to the companion flange 46 with a spline 48. A bevel gear 56 is formed at a distal end of the input shaft 50.

A planetary gear assembly 58A is interposed between the input shaft 50 and the left rear drive axle 22, and a planetary gear assembly 58B is interposed between the input shaft 50 and the right rear drive axle 24.

Since the planetary gear assembly 58A and the planetary gear assembly 58B have substantially the same construction, like reference numerals are imparted to respective constituent components, and the left-hand side planetary gear assembly 58A will mainly be described.

A bevel gear 60 meshes with the bevel gear 56 of the input shaft 50, and a ring gear 62 is connected to this bevel gear 60 with a screw 63. The ring gear 62 constitutes a ring gear which is commonly used for the left and right planetary gear assemblies 58A, 58B.

A planet carrier 64 of the planetary gear assembly 58A is fixed to the left rear drive axle 22 with a spline 66. A sun gear 68 is attached in such a manner as to rotate around the left rear drive shaft 22 via a needle bearing 70. A plurality of planet gears 72 (only one of them is shown) carried by the planet carrier 64 meshes with the sun gear 68 and the ring gear 62.

Reference numeral 74 denotes a wet multi-plate brake mechanism, and the wet multi-plate brake mechanism 74 includes a plurality of brake plates 76 attached to the housing 30 and a plurality of brake discs 78 attached to the sun gear 68 in such a manner as to be interleaved with the plurality of brake plates 76.

Each brake plate 76 is attached to the housing in such a manner as to move axially but not to rotate, and each brake disc 78 is attached to the sun gear 68 in such a manner as to move axially but not to rotate.

A circlip 80 is attached to the housing 30, and this circlip 80 implements a positioning of one end (a right end) of the multi-plate brake mechanism 74. A fine adjustment of the positioning is implemented by the thickness of end plates 82, 84.

Figure 4A:
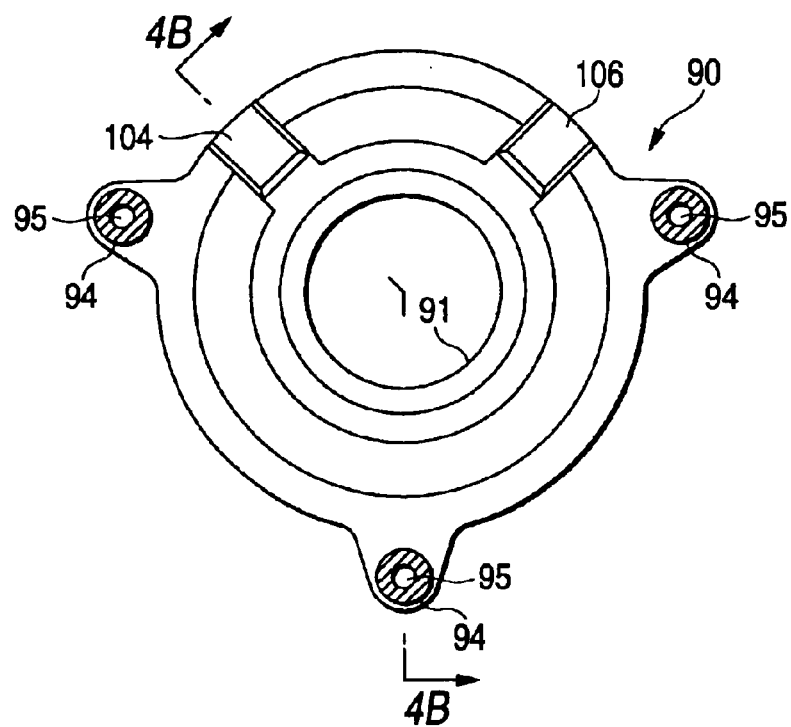
FIG. 4A is a front view of a ring-like core member.

Reference numeral 90 denotes a ring-like core member formed of a magnetic material and has a first outside diameter and an annular groove 96 having a rectangular cross section. As shown in FIG. 4A, the ring-like core member 90 has a center hole 91 and a pair of fastening portions 94. A hole 95 into which a screw is inserted is formed in each fastening portion 94.

Figure 4B:
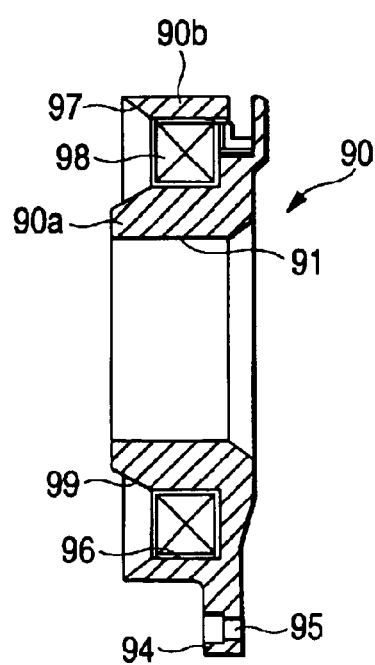
FIG. 4B is a sectional view taken along the line 4B—4B in FIG. 4A.

As best shown in FIG. 4B, an exciting coil 98 is accommodated in the annular groove 96. The core member 90 is divided into an inner circumferential part 90a and an outer circumferential part 90b by the annular groove 96, and the sectional area of the inner circumferential part 90a and the sectional area of the outer circumferential part 90b at a part where the exciting coil 98 resides are made substantially equal.

The ring-like core member 90 has an outer circumferential side tapered end face 97 which is formed outwardly of the annular groove 96 and is inclined at a first angle relative to a central axis and an inner circumferential side tapered end face 99 which is formed inwardly of the annular groove 96 and is inclined at a second angle relative to the central axis. In this embodiment, a tapered angle (the first angle) of the outer circumferential side tapered end face 97 and a tapered angle (the second angle) of the inner circumferential side tapered end face 99 are set substantially equal to each other.

As shown in FIG. 4A, the core member 90 has four projections 102, an inserting portion 104 for an exciting coil terminal 108 and a search coil terminal inserting portion 106.

As seen in FIG. 3, a search coil 100 is attached adjacent to the exciting coil 98 in the groove 96. The intensity of magnetic flux when the exciting coil 98 is energized is detected by the search coil 100, and energizing current to the exciting coil 98 is feedback controlled by the intensity of magnetic flux so detected.

Each projection 102 of the ring-like core member 90 is brought into abutment with an annular receiving portion, not shown, on the side housing 30b, and a screw 92 is screwed into a tapped hole, not shown, in the side housing 30b through a hole 95 in the fastening portion 94, whereby the ring-like core member 90 is fixed to the side housing 30b.

Figure 5:
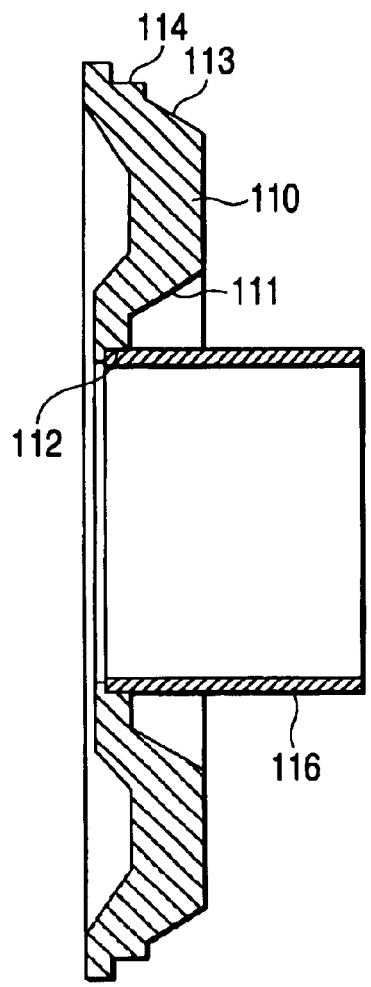
FIG. 5 is a sectional view of a ring-like armature member in a state in which a cylindrical slider is fitted therein.

A ring-like armature 110 formed of a magnetic material is disposed so as to correspond to the annular groove 96 in the core member 90. As shown in FIG. 5, the armature member 110 has a second outside diameter which is larger than the first outside diameter of the core member 90.

The armature member 110 has further an inner circumferential side tapered end face 111, an outer circumferential side tapered end face 113, an annular installation groove 112 formed in an inner circumferential portion, and an annular installation groove 114 formed in an outer circumferential portion.

The inner circumferential side tapered end face 111 has a configuration which is complement to the inner circumferential side tapered end face 99 of the ring-like core member 90. Namely, the inner circumferential side tapered end face 111 is inclined at the second angle relative to the center axis.

The outer circumferential side tapered end face 113 of the armature member 110 has a configuration which is complement to the outer circumferential side tapered end face 97 of the ring-like core member 90. Namely, the outer circumferential side tapered end face 113 is inclined at the first angle relative to the center axis.

Figure 6:
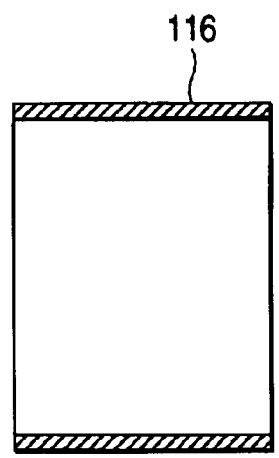
FIG. 6 is a longitudinal sectional view of the cylindrical slider.

One end (a left end) of a cylindrical slider (a cylindrical guide member) 116 shown in FIG. 6 is press fitted and fixed in the annular installation groove 112 in the armature member 110. The cylindrical slider 116 is designed to be fixed in such a manner as to become parallel with the center axis of the ring-like armature member 110 by this press fit.

The cylindrical slider 116 is formed of a stainless steel. The cylindrical slider 116 attains a radial positioning of the armature member 110 and has a function to allow the armature member 110 to be displaced uniformly in a circumferential direction.

Figure 8:
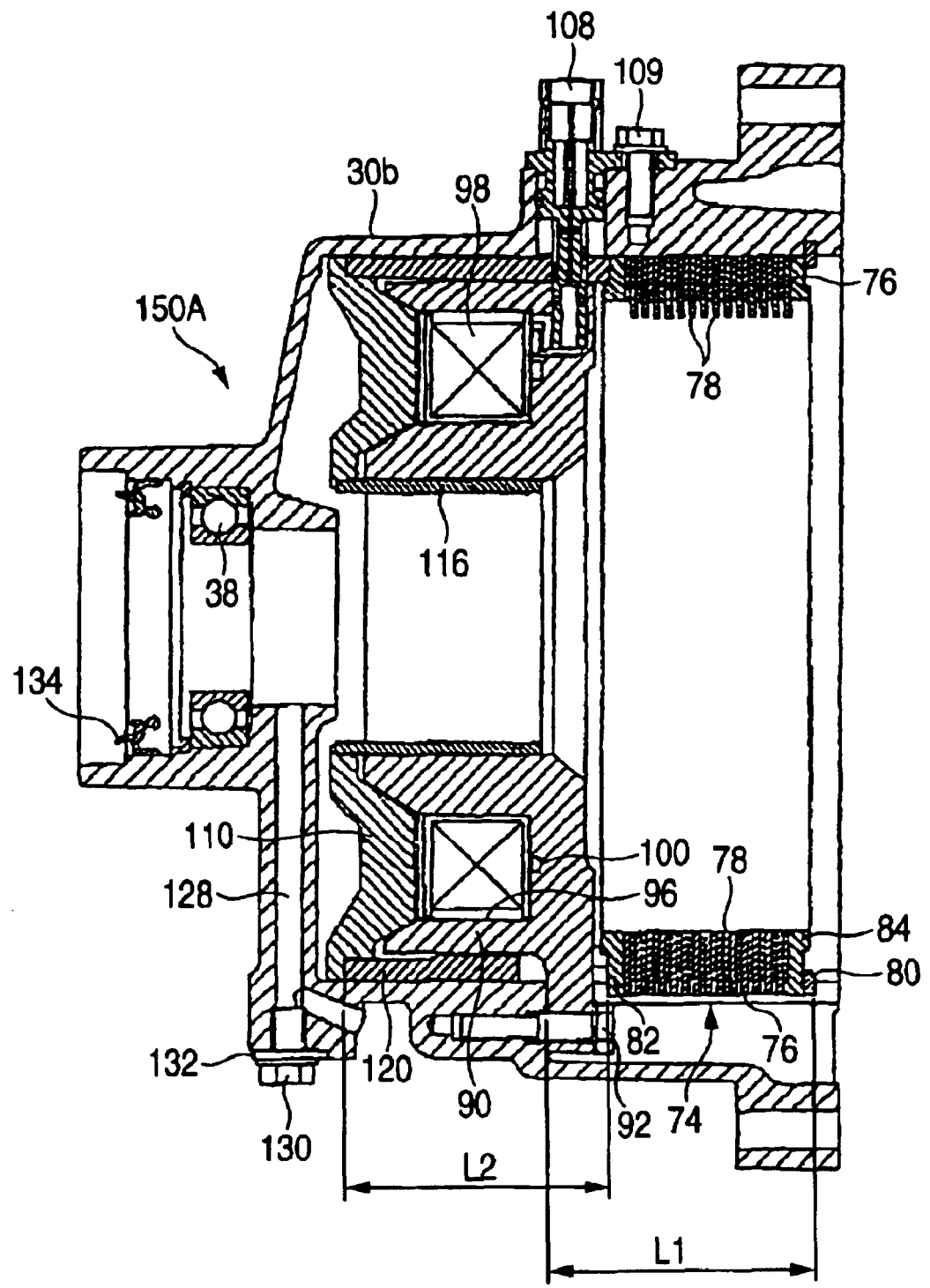
FIG. 8 is a longitudinal sectional view of the electromagnetic brake according to the embodiment of the invention.

As shown in FIGS. 3 and 8, a first end (a left end) of a cylindrical press member 120 is installed in the annular installation groove 114 in the ring-like armature member 110. A second end (a right end) of the cylindrical press member 120 is brought into abutment with the end plate 82. The cylindrical press member 120 is formed of an aluminum alloy.

Figure 7A:
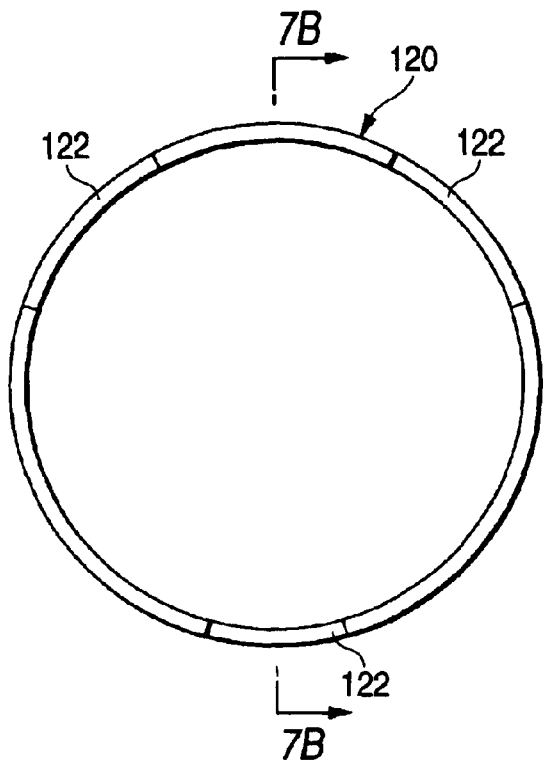
FIG. 7A is a front view of a cylindrical press member.
Figure 7B:
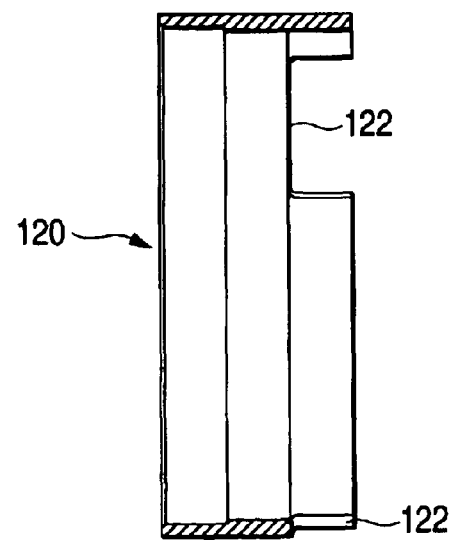
FIG. 7B is a sectional view taken along the line 7B—7B in FIG. 7A.

As shown in FIGS. 7A and 7B, the cylindrical press member 120 has a pair of notches 122 into which the fastening portions 94 of the core member 90 are inserted and four notched 124 into which the projections 102 are inserted.

FIG. 8 is a longitudinal sectional view of the electromagnetic brake 150 according to the invention. In FIG. 8, the left rear drive axle 22 and the left planetary gear assembly 58A which are shown in FIG. 3 are omitted.

Referring to FIG. 8, reference numeral 128 denotes a lubricant passage, and one end thereof is closed by a bolt 130 with a packing 132 being held therebetween. Reference numeral 134 denotes an annular oil seal, which functions as a seal for a lubricant for a ball bearing 38.

As has been described above, the inner circumferential part 90a is formed wider than the outer circumferential part 90b so that the sectional areas of the inner circumferential part 90a and the outer circumferential part 90b of the ring-like core member 90 become substantially the same. By this construction, when the exciting coil 98 is energized, the armature member 110 can be attracted with a uniform force from the inner circumferential side to the outer circumferential side.

As the exciting coil 98 is energized, a predetermined air gap is formed between the ring-like core member 90 and the ring-like armature 110, so that a metal contact between the core member 90 and the armature member 110 is prevented.

As the gap (air gap) between the core member 90 and the armature member 110 changes, since the attraction of the core member 90 and hence a pressing force applied to the multi-plate brake mechanism 74 by the cylindrical press member 120 changes, a high accuracy is required to control the air gap.

This air gap changes due to production variation and aged deterioration (wear) of the brake plates 76 and the brake discs 78 of the multi-plate brake mechanism 74.

In FIG. 8, assuming that a distance from the circlip 80 to an attachment portion of the cylindrical core member 90 to the side housing 30b is L1 and that the length of the cylindrical press member 120 is L2, L1 and L2 are designed to become substantially equal to each other.

A change in the extent of the air gap between the armature member 110 and the core member 90 that will occur when there occurs a change in temperature will be described below. When there occurs a change in temperature, a side of the armature member 110 which confronts the gap changes due to thermal expansions of the multi-plate brake mechanism 74 which is formed of iron, the cylindrical press member 120 which is formed of aluminum alloy and the armature member 110 which is formed of magnetic material.

On the other hand, when there occurs a change in temperature, a side of the core member 90 which confronts the gap changes due to thermal expansions of an L1 part of the side housing 30b which is formed of aluminum alloy and the core member 90 which is formed of magnetic material.

Since the cylindrical press member 120 is formed of aluminum alloy and its length L2 is substantially equal to the distance L1, a thermal expansion occurring at this part is offset between the armature member 110 and the core member 90, whereby a change in the extent of the air gap between the armature member 110 and the core member 90 can be suppressed to a lower level.

Figure 9:
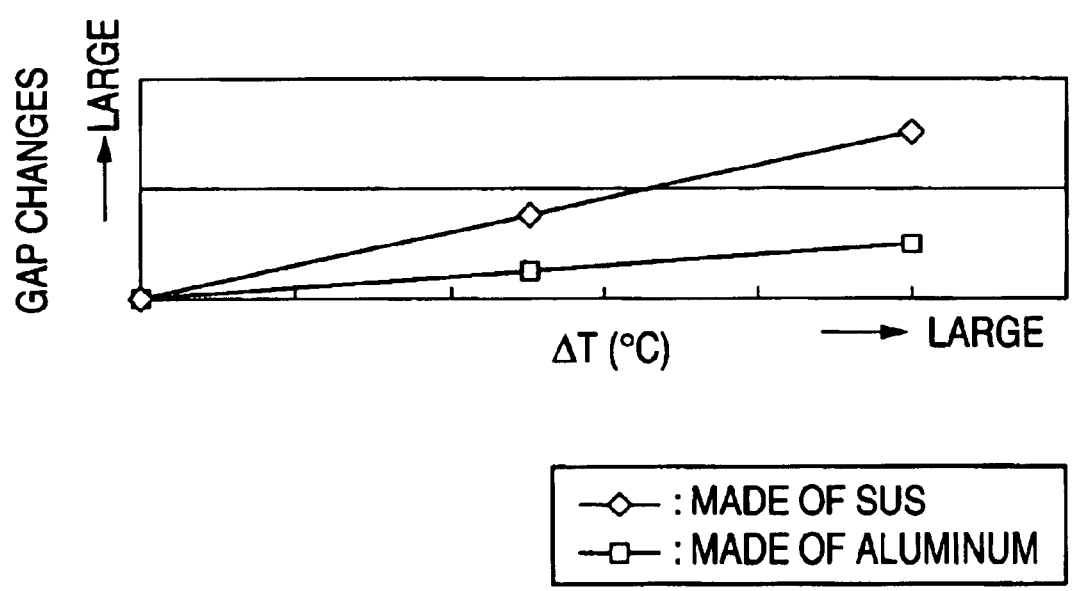
FIG. 9 is a drawing in which changes in the extent of an air gap according to temperature changes are plotted.

This will be described further by reference to FIG. 9. FIG. 9 plots changes in the extent of the air bag according to changes in temperature in the event that the cylindrical press member is formed of stainless steel and aluminum alloy, respectively.

The coefficient of linear expansion of stainless steel is $11.7 \times 10^{-6}$, and the coefficient of linear expansion of aluminum is $23.9 \times 10^{-6}$. Assuming that the length of the cylindrical press member 120 is 43.9 mm, in the event that the temperature changes by 100° C., with a cylindrical press member 120 formed of stainless steel, the extent of the gap changes by 0.075 mm, and with a cylindrical press member 120 formed of aluminum alloy, the extent of the gap changes by 0.025 mm.

Thus, the change in the extent of the air gap in conjunction with the change in temperature can be suppressed to a lower level by adopting the cylindrical press member 120 formed of aluminum alloy. As a result, a change in the attraction of the core member 90 and hence the pressing force applied to the multi-plate brake mechanism 74 by the cylindrical press member 120 due to a change in temperature can be suppressed to a lower level, whereby a highly accurate electromagnetic brake can be provided.

The function of the embodiment will be described below.

In the event that both left and right electromagnetic brakes 150A and 150B are switched off due to the exciting coils 98 for the electromagnetic brakes 150A, 150B being not energized, since the multi-plate brake mechanism 74 is not brought into engagement, the sun gears 68 of the planetary gear assemblies 58A, 58B rotate idly around the left and right rear drive axles 22, 24, respectively.

Thus, no driving force (torque) of the input shaft 50 is transferred to the left and right rear drive axles 22, 24. As this occurs; the rear wheels 26, 28 spin, and all the driving force is supplied to the front wheels 12, 14, whereby the vehicle functions as a two wheel-drive vehicle.

In the event that a predetermined amount of current is conducted to the exciting coils 98 of the left and right electromagnetic brakes 150A, 150B, so that both the multi-plate brake mechanisms 74 are brought into total engagement via the cylindrical press members 120, the sun gears 68 of the planetary gear assemblies 150A, 150B are fixed to the housing 30, respectively, and the driving force of the input shaft 50 is transmitted to the left and right rear drive axles 22, 24 via the ring gear 62, planet gears 72 and the planet carriers 64.

Thus, the driving force of the input shaft 50 is uniformly distributed and transferred to the left and right rear drive axles 22, 24. As a result, the four wheel-drive vehicle shown in FIG. 2 is put in a four wheel-drive mode and moves straight ahead. In the case of a front-engine, rear-drive (FR) vehicle, the driving force is uniformly distributed to the left and right rear wheels, and the vehicle moves straight ahead.

In addition, when the vehicle turns or attempts to get out of a muddy spot in a road, by controlling the value of current conducted to the exciting coils 98 of the left and right electromagnetic brakes 150A, 150B, the driving force of the input shaft 50 can arbitrarily be distributed to the left and right rear drive axles 22, 24, whereby an optimum turn control and/or facilitated getaway from a muddy spot can be realized.

While the invention has been described as the driving force distributing apparatus 20 being provided on the rear wheels side in the above description, the similar driving force distributing apparatus 6 may be provided on the front wheels side of the FF vehicle shown in FIG. 1.

Furthermore, in a case where the driving force distributing apparatus 20 is provided on the rear wheels side, the provision of the apparatus is not limited to the four wheel-drive vehicle shown in FIG. 2 and the driving force distributing apparatus 20 may be provided on a rear wheels side of an FR vehicle.

In the above description, while the embodiment is described in which the electromagnetic brake according to the invention is applied to the driving force distributing apparatus 20, the invention is not limited to this application and can be applied to any mechanism or apparatus which has an electromagnetic brake interposed between a stationary housing and a rotational member.

According to the first aspect of the invention, since the cylindrical guide member fitted in the core member is provided in such a manner as to be fixed to the inner circumferential portion of the armature member so as to allow the armature member to be guided by the core member to thereby move in the direction in which the multi-plate brake mechanism is pressed, the selection of materials for the cylindrical press member while considering thermal expansion is made possible, so that the change in the extent of the air gap between the ring-like armature member and the ring-like core member becomes small which will occur as the temperature changes.

The cylindrical guide member attains the radial positioning of the armature member, whereby the armature member is allowed to be displaced uniformly in the circumferential direction.

According to the second aspect of the invention, since the housing and the cylindrical press member are formed from the identical material, the change in the extent of the air gap that will occur as the time changes can be suppressed to a lower level, thereby making it possible to provide a highly accurate electromagnetic brake. In a case where the electromagnetic brake is applied to the driving force distributing apparatus, the deterioration of driving force distributing accuracy due to change in temperature can be suppressed to a lower level.

What is claimed is:

1. An electromagnetic brake interposed between a stationary housing and a rotational member which is accommodated at least partially in the stationary housing, the electromagnetic brake comprising:

a multi-plate brake mechanism having a plurality of brake plates attached to the stationary housing and a plurality of brake discs attached to the rotational member in such a manner as to be interleaved with the plurality of brake plates;

a ring-like core member having an annular groove and a first outside diameter and fixed within the housing;

an annular exciting coil accommodated in the annular groove in the core member;

a ring-like armature member having a second outside diameter which is larger than the first outside diameter and disposed in such a manner as to confront the annular groove in the core member;

a cylindrical press member having a first end and a second end and fitted on the core member in such a manner as to freely move in a direction in which the multi-plate brake mechanism is pressed, the first end being fixed to an outer circumferential portion of the armature member, the second end being brought into engagement with the multi-plate brake mechanism; and a cylindrical guide member fixed to an inner circumferential portion of the armature member at one end thereof and fitted in the core member so that the armature member is guided by the core member so as to move in the direction in which the multi-plate brake mechanism is pressed.

2. The electromagnetic brake as set forth in claim 1, wherein the housing and the cylindrical press member are formed from an identical material.

3. The electromagnetic brake as set forth in claim 1, wherein the housing and the cylindrical press member are formed from aluminum alloy.

* * * * *